United States Patent
Kolodziej (10) Patent No.: US 8,923,888 B2
(45) Date of Patent: *Dec. 30, 2014

(54) LOCAL CONTENT RECOMMENDATIONS

(75) Inventor: Krzysztof Kolodziej, Hoboken, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 315 days.

This patent is subject to a terminal disclaimer.

(21) Appl. No.: 13/524,846

(22) Filed: Jun. 15, 2012

(65) Prior Publication Data

US 2013/0337838 A1    Dec. 19, 2013

(51) Int. Cl.
*H04W 4/00* (2009.01)

(52) U.S. Cl.
USPC ............ 455/456.3; 455/41.2; 455/414.3; 455/517; 455/518; 370/338

(58) Field of Classification Search
USPC ........ 455/456.1–457, 414.1–414.3, 517–519, 455/41.2, 41.3, 566
See application file for complete search history.

(56) References Cited

U.S. PATENT DOCUMENTS

| | | | |
|---|---|---|---|
| 6,714,791 B2 * | 3/2004 | Friedman | 455/456.1 |
| 6,731,940 B1 | 5/2004 | Nagendran | |
| 6,912,398 B1 | 6/2005 | Dominitz | |
| 8,099,109 B2 | 1/2012 | Altman et al. | |
| 8,200,247 B1 * | 6/2012 | Starenky et al. | 455/456.3 |
| 8,428,622 B1 * | 4/2013 | Zhang | 455/456.3 |
| 8,515,459 B2 * | 8/2013 | Busch | 455/456.3 |
| 8,611,930 B2 * | 12/2013 | Louboutin et al. | 455/456.3 |
| 8,620,376 B2 * | 12/2013 | Kwon et al. | 455/552.1 |
| 8,666,376 B2 * | 3/2014 | Ramer et al. | 455/414.3 |
| 8,737,691 B2 * | 5/2014 | Sivaraman et al. | 382/104 |
| 2004/0087273 A1 * | 5/2004 | Perttila et al. | 455/41.2 |
| 2004/0203863 A1 | 10/2004 | Huomo | |
| 2005/0255861 A1 | 11/2005 | Wilson et al. | |
| 2007/0060173 A1 | 3/2007 | Ramer et al. | |
| 2008/0040329 A1 | 2/2008 | Cussen et al. | |
| 2009/0157632 A1 | 6/2009 | Ryu et al. | |
| 2009/0163183 A1 | 6/2009 | O'Donoghue et al. | |

(Continued)

FOREIGN PATENT DOCUMENTS

| | | |
|---|---|---|
| EP | 2073498 | 6/2009 |
| WO | 2009/083719 | 7/2009 |

OTHER PUBLICATIONS

Tsunoda, et al., "Location Based Query Routing for Distributed Spatial Data in Mobile Ad Hoc Network," 7th Asia-Pacific Symposium on Information and Telecommunication Technologies, 2008. APSITT, pp. 241-246, Apr. 22-24, 2008.

*Primary Examiner* — Sharad Rampuria (57) ABSTRACT

A method is provided for offering content recommendations to a mobile station based on a current location of the mobile station. Records of one or more other mobile stations within a distance of the location at a set time frame can be identified. In association with the location of the other mobile station, identification of the time at which that other mobile station was at the location can be recorded. For each identified record of another mobile station, a search query or a result is then identified. In association with the location of the other mobile station, identifications of the search and/or result resident on that other mobile station can be recorded. The response to an inquiry from the mobile station is a recommendation that includes information about the identified search query and/or result resident on one or more of the other mobile stations.

15 Claims, 7 Drawing Sheets

(56) References Cited

U.S. PATENT DOCUMENTS

| | | |
|---|---|---|
| 2010/0004004 A1 | 1/2010 | Browne-Swinburne et al. |
| 2010/0063854 A1 | 3/2010 | Purvis et al. |
| 2010/0331016 A1* | 12/2010 | Dutton et al. ............. 455/456.3 |
| 2011/0105150 A1 | 5/2011 | Moon et al. |
| 2011/0238751 A1* | 9/2011 | Belimpasakis et al. ....... 709/204 |
| 2012/0009956 A1 | 1/2012 | Zhang et al. |
| 2012/0021770 A1 | 1/2012 | Naqvi |
| 2012/0190386 A1* | 7/2012 | Anderson .................. 455/456.3 |
| 2013/0035114 A1* | 2/2013 | Holden et al. ............. 455/456.3 |
| 2013/0137464 A1* | 5/2013 | Kramer et al. ............. 455/456.3 |
| 2013/0337841 A1* | 12/2013 | Johnson .................... 455/456.3 |
| 2014/0057657 A1* | 2/2014 | Manber et al. ............. 455/456.3 |
| 2014/0066098 A1* | 3/2014 | Stern et al. ................. 455/456.3 |

\* cited by examiner

LOCAL CONTENT RECOMMENDATIONS

BACKGROUND

Mobile communication services have expanded and are used by a large majority of people in developed countries around the world. Networks offer wireless mobile communication service for voice calls, mobile messaging services (e.g., text and/or multimedia) and data communications. The data communication capabilities of the mobile stations and the broadband data communication services offered by the networks enable users to perform more and more tasks from their mobile stations and users expect to be able to do more and more.

Shopping has also evolved with the evolution to telecommunications technologies. On-line shopping is now commonplace, and increasingly, users can do their on-line shopping using their mobile stations. On-line shopping can be for everything from traditional goods or services to shopping for content to download to the mobile station. Examples of mobile station content items include, without limitation, media, games, messaging, social networks, stores, and any other applications or information for use on or with a mobile station.

Mobile application stores traditionally provide the following options to allow a user to discover applications: 1) search by keywords, 2) browse categories such as Games, Business, Lifestyle, Shopping, Travel & Local, etc., or sub-categories such as Top Paid, Top Free, recent arrival, 3) recommendations, based on (a) the store's pick, (b) the user's download history, or (c) Context Relevance. Applications are then listed based on the number of downloads.

When traveling, relocating, or otherwise exploring an unfamiliar location, relevant mobile station content may be difficult to find. At least some content may be of particular interest to the local community, with minimal popularity outside the area. For example, a parking spot finder in San Francisco, or a Chicago transit schedule would likely be known to and used by the local community and may be of interest to travelers visiting those cities. However, visitors may not know or think about the availability of such applications. Moreover, it may be difficult to ascertain quickly the mobile station content items that are of particular interest to those in the vicinity or anticipated vicinity of the user, and thus might also be of interest to the user.

Hence a need exists for improved technologies for distributing recommendations, for example, which provide a user with an indication of mobile station content that is popular with nearby users of mobile stations.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods disclosed herein relate to providing recommendation of content to a user of a mobile station. Content in this regard can both be applications to be used with the mobile station, or commerce opportunities or suggestions, for example, nearby restaurants, shops, or information on particular brands or goods. By using the mobile device's location and other factors, a new dimension may be provided to users to discover content.

Figure 1:
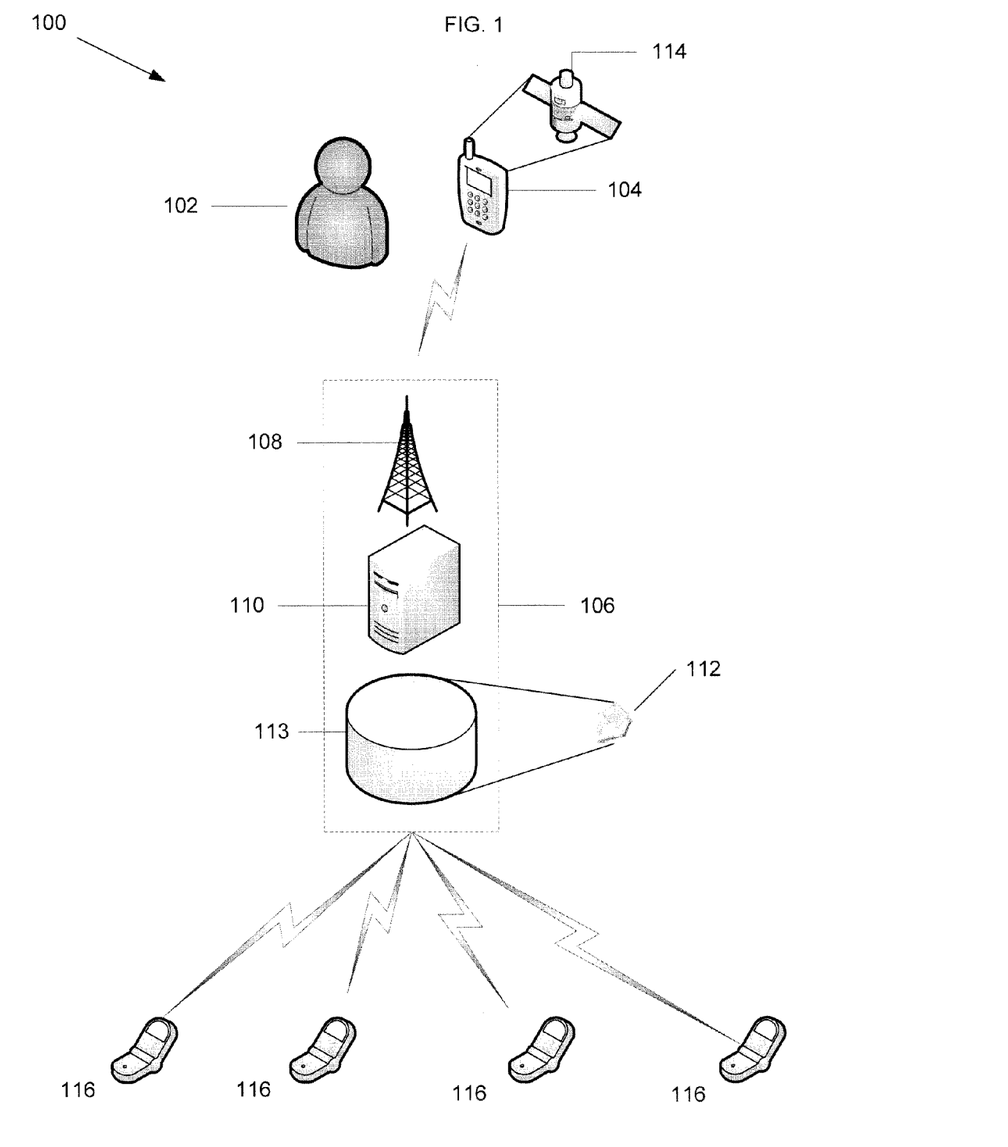
FIG. 1 illustrates a simplified network diagram in one embodiment.

Reference now is made in detail to the examples illustrated in the accompanying drawings and discussed below. FIG. 1 illustrates an example of a system 100 for delivering local content based on a search. A user 102 has a mobile station 104 which communicates with a wireless communication network 106. A variety of different types of mobile stations 104 supporting such communications are widely available. Today, mobile stations typically take the form of portable handsets, smart-phones, tablet computers, or personal digital assistants, although they may be implemented in other form factors. The mobile station 104 can access at least the cellular network and/or WiFi network for voice communications (i.e. telephone calls, push-to-talk, etc.), messaging and content/data transfer. Further, the mobile station 104 can include a global positioning system ("GPS") chip 114. The GPS enabled mobile station 104 can be used to determine the mobile station's location. Other methods (such as triangulation) can also be used to determine the location of a particular mobile station.

The network 106 can generally contain all of the elements required for wireless mobile station communication and content exchange, including a base station 108, a server 110, and a database 112 as well as other known elements (not shown for convenience). The database 112 can include a content usage and search query database. The content usage and search query database can be stored in at least one storage device 113 and includes records for the mobile station 104. The server 110 can include a processor. Further, the server 110 can include a content and/or search query download server having an interface for communications with the mobile station 104 via the wireless communication network 106. An example of an interface between the server 110 and the mobile station is discussed below and illustrated in FIG. 4. The network server 110 can also include a content usage server and/or a search query server.

Additionally, there are multiple other mobile stations 116 that communicate with the network 106. The other mobile stations 116 are typically operated by individual users. The other mobile stations 116 can also have GPS chips and access the network 106 for voice communications, messaging and content transfer.

The network 106 can monitor the location of the individual mobile stations 104, 116. Along with monitoring the location, the network 106 can also monitor and store individual transactions made by the mobile stations 116, including the purchasing of goods, services, and content. In addition, the network 106 can monitor search activities. Search activities can include information or items searched for and returned through any search engine. Search engines include, but are not limited to: Google, Yahoo, Bing, and Ask. As users request information through their mobile stations 116, the network 106 can monitor what is searched for and the results of the search. As discussed below, since the data continually changes over time, in one example, there can be a time factor associated with the monitoring. The time factor can be a relevant time period over which data is returned. For example, for search activities, the network 106 can return only searches made in the 48 hours prior to the time the query was made by the user mobile station 104.

The mobile station 104 can now access this location/content/search information in multiple ways. In one example, the mobile station 104 can perform a search for goods, services, or content and the search can be based on the mobile station's 104 location. The location may be set by the user, e.g., manually by entering a zip code, city or county, or automatically the current location of the mobile station 104 of the user 102 based the location determined by the GPS chip 114. Also, the location can be an anticipated or expected future location that the user specifies manually, e.g., by dropping a pin on a map, entering a latitude and longitude, or entering an address, among other methods.

Figure 2A:
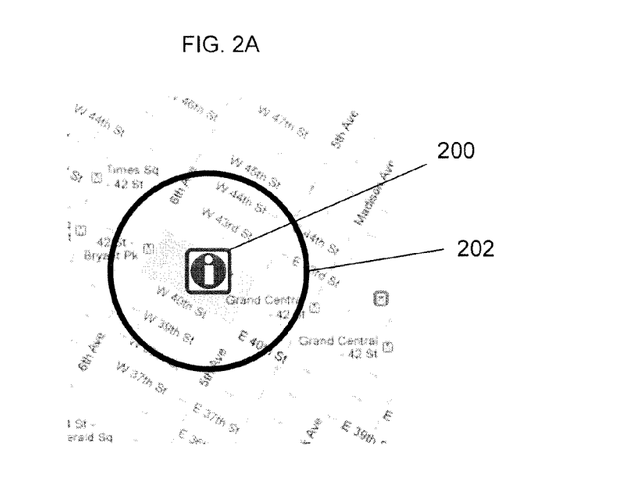
FIGS. 2a & 2b illustrate examples of distance radii.

The user 102 can also set a specified radius around the location. In an example, the user can specify a radius by entering a distance from the current or selected location of the mobile station 104. This radius can be preset or requested each time the mobile station 104 requests results. Another example is that the user can draw the area on a map provided on the mobile station 104. The area drawn can be a circle or any other shape, allowing, in one example, for the user 102 to include or exclude specific locations from the search area. FIG. 2A illustrates the location 200 with a first radius 202. In this example, the user 102 can set the radius based on the type of search. Thus, if the user 102 wants to find an Italian restaurant close by, the user can set a specified distance. The distance from the location 200 can be in standard length measurements (e.g. feet, meters, miles, etc.) or in other units, for example, city blocks, or number of subway or bus stops. For other searches, the user 102 can specify a larger radius. The larger radius provides more choices to the user. Alternately, the user 102 may be aware that the good or service searched for is not likely found in many places in the local area (such as in a town rather than a city, or in certain areas/neighborhoods of a city rather than others) and a larger radius may be necessary to find the specified good or service. In an example, a searching for transportation centers (airports, train stations, ship docks) the default radius can be 100 miles. For more common searches for local providers or activities, the search radius can be 1-5 miles.

Figure 2B:
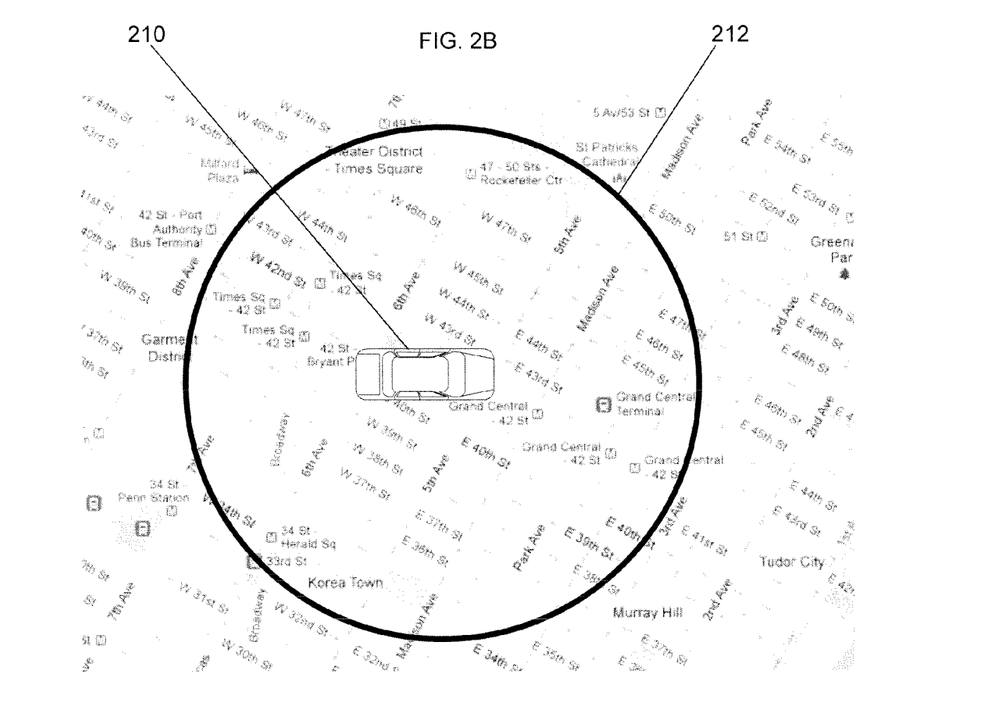

In other examples, the radius of the search can vary automatically based on the movement of the mobile station 104/user 102. Using the location of the mobile station 104 over time, the network 106 can determine if the mobile station 104 is stationary, walking, or traveling in a vehicle, e.g., using averaging of speed of location change over time. FIG. 2B illustrates that the mobile station location 210 is in a vehicle and thus expands the second radius 212 as there are more locations that are able to be reached in a similar amount of time as walking. This can assist the user 102, since, for example, traveling a mile to a good or service in a vehicle is less time consuming than walking and the user 102 may not wish to walk a mile but may not mind driving this distance.

The automatic variation of the radius can, in some examples, expand and contract from city blocks to miles and distances in between. The server 110 can take any number of features, for example, the ones discussed above, to determine an appropriate radius. The radius can also be varied based on number of search results and/or the number of other mobile stations 116 that are available to draw from. Thus, if it is a low number of searches within the preset radius, the server 110 may expand the radius to capture enough data to make a significant ranking, or a sufficient list of results, if possible. This is also true if the number of other mobile stations 116 in the preset radius is low. The server 110 can expand the radius so it is able to return a meaningful response to the user. What the sufficient number in both cases is can be set automatically by the system 100 or the user 102.

Examples of the above can include that there is a sufficient number of other mobile devices 116 within a radius, but those mobile devices 116 have not performed enough searches within the preset timeframe to provide a meaningful result to the user 102. Alternately, there are not "enough" mobile stations 116 inside the radius to return a meaningful result. The system 100 can expand the radius to capture outer mobile devices 318. Also, the user 102 may request a minimum number of results for different types of searches, and the radius may need to be expanded to provide the minimum number of searches. As an example, the user 102 may request that at least two options are provided for a restaurant search, depending on the time of day and the area, the radius may need to be expanded to find two establishments that meet the search criteria and that are open.

These examples help account for the differences in "density" between urban and rural areas. To provide acceptable results to the mobile station 104 that is located in the heart of a city may only require a few block radius. However, the same number of results may require a radius of miles in a rural area. This can help the system from presenting to the user 102 results that a skewed due to a small sample set.

In a further example, content can be searched and delivered to the mobile station 104 based on location as well. In one example, content can be suggested or delivered to the mobile station 104 based on the current or future location of the mobile station 104, the latter of which is provided by the user, for example, if the user knows that he/she will be in the local in a particular future time period. For example, if the mobile station 104 is located in New York City, the system can suggest content based on New York City (based on the above transactions and searches) using mobile devices in New York City whether or not the mobile station 104 is not located in New York City. This content can include street and mass transit maps, local shops that may be of interest to the user, information regarding hotels, parking, sightseeing, gas stations and prices, traffic, etc.

Figure 3:
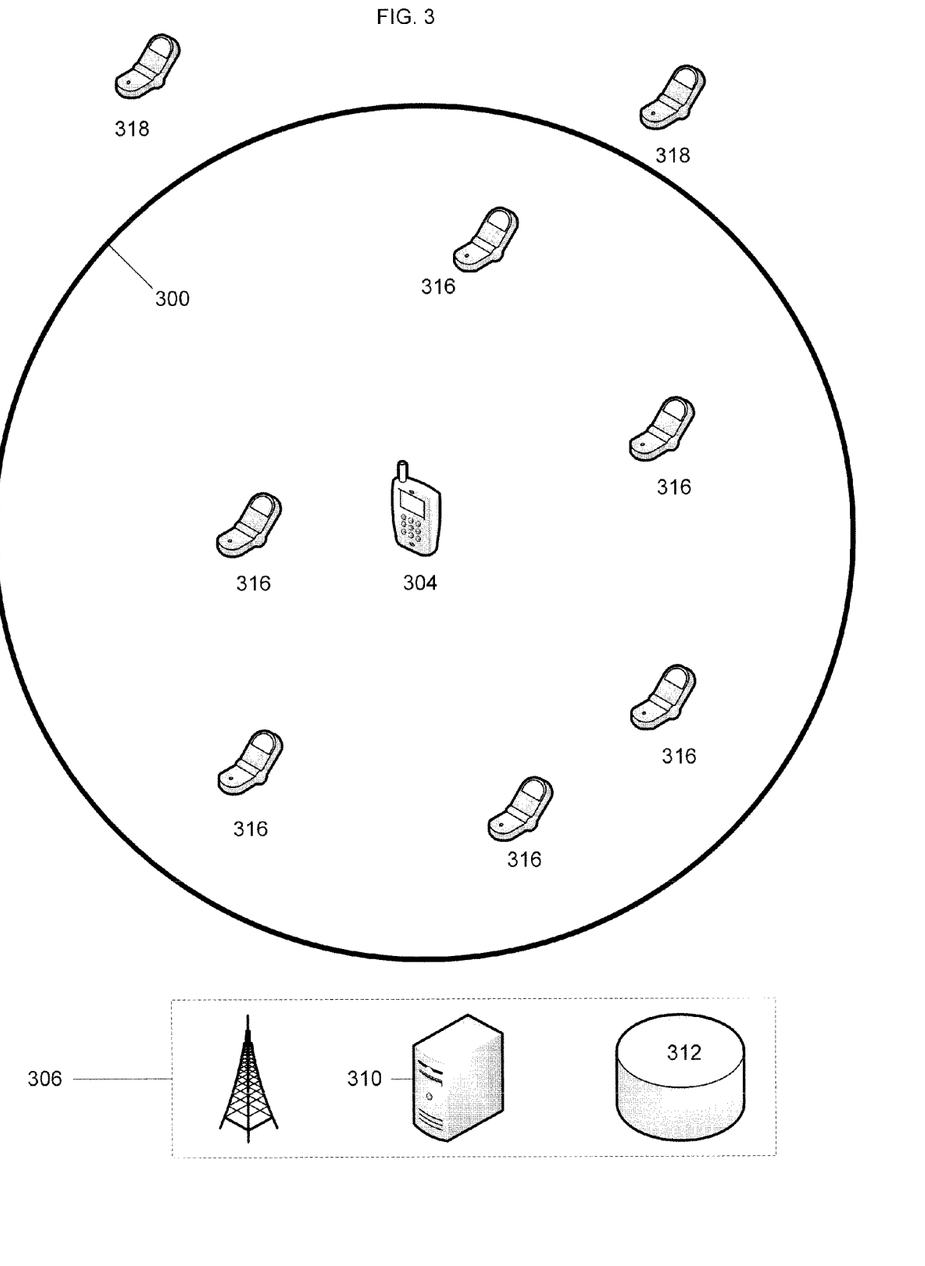
FIG. 3 illustrates a further example of the network and distances from a mobile station.

An additional example is illustrated in FIG. 3, wherein the content suggested or delivered to the mobile station 304 based on the location of the mobile station 304 and the content present on other mobile stations 316 within a radius 300 of the mobile station 304. In an example, the network 306 determines the location of the mobile station 304 making the search request and then determines the radius 300 set either by default or the user 102, as described above. The network 306 then determines which other mobile stations 316 are within the radius 300, as opposed to outside the radius 318. The determination of the location of the other mobile stations 316, 318 can be performed in multiple ways. One example can be that the network 306 stores the locations of the other mobile stations 316, 318 and retrieves their locations from the database 312 based on proximity to the mobile station 304. Depending on how frequently the database 312 is updated with locations, the network 306 can send a location request to the other mobile stations 316, 318 to determine their location to coincide with the user's request. The location request can be to all mobile stations 316, 318 or just a verification of the other mobile stations 316 already identified from the information in the database 312.

Once the mobile stations 316 inside the radius 300 are determined, the server 310 can search the database records for the other mobile station 316 for information pertaining to the user's 102 request or interests. In the examples below, the mobile station 304 can either make a request for the information or the information can be "pushed" dynamically to the mobile station 304 as the location of the mobile station 304 changes and/or as the other mobile stations 316, 318 move in and out of the radius 300. Further, in the below examples, the server 310 can get the information to pass to the mobile station 304 by querying the database 312 or the other mobile stations 316 directly, or both.

In one example, the mobile station 304 is provided a list of applications that are the most popular based on the surrounding other mobile stations 316. Popularity can be based on the number of other mobile stations 316 that have the particular application or frequency of usage of particular applications. The applications can be ranked by popularity and some or all applications can be presented. For example, FIG. 3 illustrates 6 other mobile stations 316, and a list of all the application present on the other mobile stations 316 can be presented. Further, if all 6 have the same application, it can be considered a highly popular application and can be placed higher on the list presented to the mobile station 304.

The list provided to the mobile station 304 can be sorted and filtered in many ways. One way can be to filter out any applications already on the mobile station 304 to reduce duplicates. In this example, if mobile stations 316 have the application "Angry Birds" and the user mobile station 304 does as well, Angry Birds is not displayed on the list.

Another filter can be to filter by keyword based on the location. For example, if the user 102 is in New York City, any application with the terms "New York," "NYC," "Manhattan," etc. can be preferentially displayed. This keyword selection can have even finer granularity, either within the system or keyed in by the user. For example, if the user is in the West Village of New York City, the filter can look for "West Village", as opposed to just "NYC" because the network 306 knows the mobile station's 304 location. Alternately, the user can enter the keyword to help narrow a broad search that was already performed on the mobile station's location.

A further example of information that can be returned to the mobile station 304 can be based on the number of other mobile stations 316 at a particular location. For example, the server 310 can rank a location higher if there are more other mobile stations 316 in its location than in other locations. For example, if the user 102 is searching for Italian restaurants, the server 310 can determine that there are a preponderance of the other mobile stations 316 in one nearby restaurant as opposed to another and report that the first restaurant is more popular. It could also be that the restaurant with more other mobile stations 316 is having a special that causes its increase in popularity, either way, the user 102 can be notified that this restaurant ranks higher than others in its category.

As above, in another example the results returned may be based on searches made by the other mobile stations 316. The server 310 can monitor, and/or the database 312 store, the search terms used by the other mobile stations 316 and the results of those searches. Thus, if the other mobile stations 316 are searching for "direction to the parade," the mobile station 304 can be informed that there is a parade nearby and be provided directions. This suggestion can be based on the search terms and the directions are provided from the relevant results retrieved by the other mobile stations 316. The search and its results can fall into any category, from restaurants, to entertainment, to books.

Figure 4:
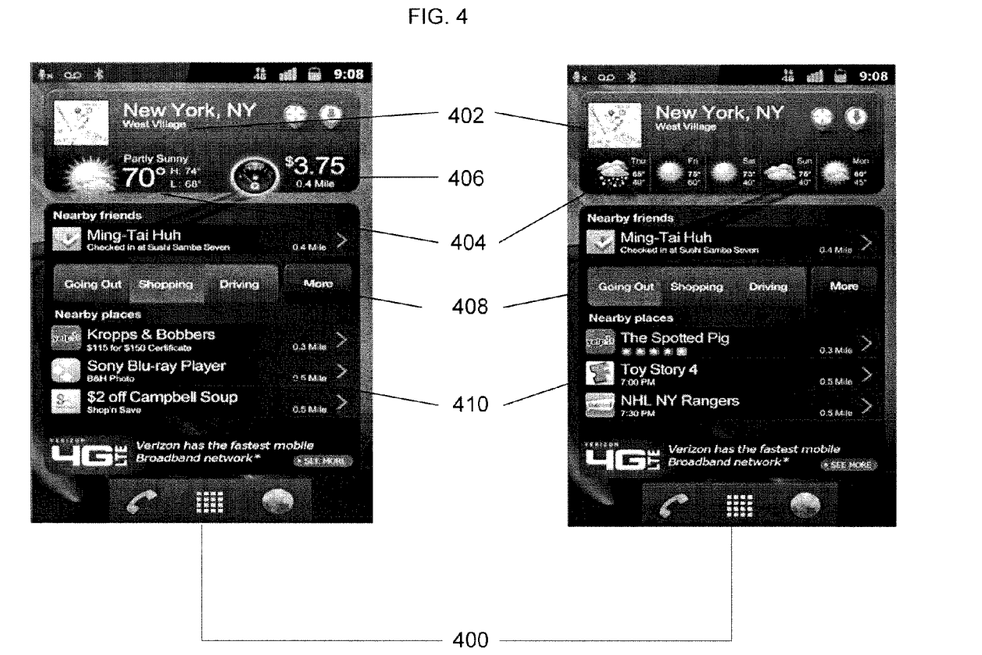
FIG. 4 illustrates an example of a front end, or client on the mobile station providing suggestions.

FIG. 4 illustrates examples of the screen 400 of a mobile station 104, 304 displaying the results of the above examples. The screen 400 of the mobile station 104, 304 can provide the user with the location 402 of the mobile station. The current weather and/or extended forecast 404 and information about nearby vendors, like gasoline prices 406, can also be provided, upon selection by the user 102. Preselected menus 408 can be provided to the mobile station 304. These menus 408 provide presorted results based on the menu categories. Categories can include "going out," "shopping," "driving" as shown or "Applications" and "Kids," which are not illustrated. As illustrated, the results 410 from these menus 408 can be broad and diverse. Under the "shopping" menu, a salon, an electronics store and a grocery store, and their associated deals/coupons, are presented, as well as the distance from the present location of the device. Under the "going out" menu, presented are a restaurant, a movie and a sporting event. In another example, the menus 408 can be filtered by the user 102 (e.g., just groceries and movies) for any combination of more specific results in a category. By selecting any of the items in a menu, enhanced information may be provided about the item including, for example, a description of the item, online ratings, deals/coupons, and directions from the current location of the mobile device.

The information provided in the preselected menus 408 can be the result of any or all of examples of queries of the other mobile stations 316. The information can be based on the applications that support these selections (for example, Fandango for the movie results), the number of other mobile stations 316 populating these locations, or the searches made on the other mobile stations 316 (for example, multiple searches for where "Toy Story 4" is playing, or deals on Campbell Soup).

A noted above, there are multiple examples of how to perform the searches. In an example, one factor is time. One time factor is how often the other mobile stations 116, 316 are queried and/or their information and location stored in the database 112, 312. For example, the server 110, 310 may query the other mobile stations 116, 316, 318 in minute increments (1, 5, 10, 20 minutes, etc.), or on the quarter, half or whole hour, depending on, for example, how many other mobile stations 116, 316, 318 are in a particular range and/or how active they are. Alternately, the server 110, 310 can query the other mobile stations 116, 316, 318 when the request is made by the user mobile station 104, 304. Another example uses a combination of the two query times. The server 110, 310 can query all of the mobile stations 104, 304, 116, 316, 318 at preset intervals, these intervals typically being long intervals (e.g., on the half hour, hour, or several hours). This can be used as a baseline for the location of the mobile stations. Then, when results are to be delivered to the user mobile station 104, 304, the server 110, 310 can look to the stored other mobile stations 116, 316 and then only query them for results. The query results can be twofold, one to verify that the other mobile station 316 is still within the set radius 200, 210, 300 and if any new data, content or searches have been provided to the other mobile station 116, 316 that needs to be included in results. This example provides both optimization of the captured data and efficiency in only having to query a smaller subset of other mobile stations 316. An alternate example can be that all elements from all mobile stations are monitored at all times and stored and updated as needed. This includes location, data, and content.

Another example of a time factor can be the amount of time a result is counted for its popularity. Thus, the popular or relevant data, content, or search is that which has been requested a certain number of times within a certain period of time (e.g., minutes, hours, days, weeks). In this way, the server 110, 310 can track trends. For example, as the time to an event nears, it is likely that the information surrounding that event is requested more often (e.g., requests for the application used at the event, directions, ticket prices, etc.). Thus, six months prior to the event, it is likely there will be little interest, but one week from the event, the associated information is likely much more popular and is now popular enough to be provided to the user mobile station 104, 304.

Like the radius, the various time periods can be preset by the server 110, 310 or set by the user 102. Different times can be set for different types of searches, content and data. The times that the system 100 can be set can be both past and future times. The "past" times are, as discussed above, the time periods in which the server 110 looks back on to retrieve relevant data. The "future" time can be if a certain result has an expiration date at a point in the future from the time the mobile station 104 makes its query. For example, sales at stores can last only a day or so (e.g., over a weekend) or a week, so the time frame for that information should be short (minutes to hours), so that expired sales are not presented to the user 102. The server 110 can be provided with expiration dates or scan the results to determine if they are past dated. On the other hand, the popularity of a restaurant may build over time, and the time frame for that can be weeks or months. Restaurants can also be categorized at the instant of the request, letting the user 102 know which restaurants are popular at that moment, but can also be used as a crude estimate of wait time to get a table at the restaurant. In an example of providing a wait time estimate, users 102 may be encouraged to "check-in" to a location. This check-in informs the network 106 that the user is at a specific location, and it can even be inferred that it is for a specified period of time. In a restaurant example, wait time can be crudely determined by the number of other mobile stations 116, 316 checked in to that restaurant's location. Further, the system can be preprogrammed that users typically spend a certain amount of time at a location once checked in. To continue with a restaurant example, once a mobile station 116 checks in to a restaurant, the server 110 knows that a restaurant typically takes 2 hours before a user is checked out of the location.

Other ways to identify popular information for the user 102 of the mobile station 104, 304 can be based on the preferences set by the user 102 or the typical searches or applications used by the user 102. For example, if the user 102 has a number of food based applications and is typically searching for restaurants, the server 110, 310 can provide information regarding popular restaurants and/or food events automatically as their popularity begins to trend upwards. The same can be done for movies, sports, clothing, etc.

Another example lets the user 102 watch the trends as application/data/content start to rise or fall. This allows a user 102 to either get a "rising" application sooner if the user wants to be an early adopter. Alternately, the user can wait until the trend reaches a certain number, so the user can feel that the application has been used long enough without errors. In examples, the user 102 can set the trending numbers. The user can specify a particular number or percentage of the other mobile stations 116, 316 that have the data/content/search information before it is presented to the user mobile station 104, 304.

A threshold number can be set by the system or user before a trend receives a specific label and/or lead to a specific action. The threshold can be calculated in number of users, percentage of continuous growth (on average), etc. For example, reaching certain threshold numbers can identify that the application has gained enough popularity to be presented to the user 102 as a "new" application. The growth over time can indicate the application's popularity. A popular or "hot" application can have increased in popularity over a specified time period. For example, an increase of at least 10% over the course of a number of days.

Figure 5:
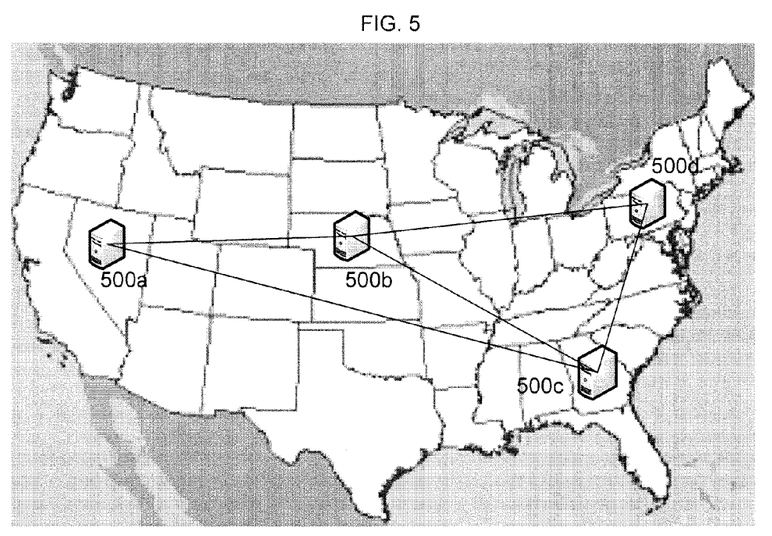
FIG. 5 illustrates an example of servers communicating with each other.

While the location and data/content/search information can be very helpful to the user 102 on the front end, a network service provider providing the network 106, 306 can also benefit from the information. As illustrated in FIG. 5, a network service provider can service different regions with separate provider servers 500a, 500b, 500c, 500d. In one example, the provider servers 500a, 500b, 500c, 500d independently service their region, but also communicate with each other. In a non illustrated example, there can be a master server that communicates with each the provider servers 500a, 500b, 500c, 500d and acts as a central point. Each provider server 500a, 500b, 500c, 500d can monitor the popularity of particular applications/data/content, including wallpapers and ringtones, and can alter its service parameters to assure that the most popular information is readily available.

As an example, a ringtone may be available from a third party website; however as it gains in popularity, retrieval of the ringtone may slow down due to constraints on the website. The provider server 500a, 500b, 500c, 500d can then save the ringtone locally to service its users more efficiently. Another example can be that the provider server 500a, 500b, 500c, 500d can store more copies of the particular application/data/content to again facilitate better service to the user. This can also lead to the removal of stored or cached application/data/content as it loses popularity so the provider server 500a, 500b, 500c, 500d can optimize storage space. Further examples let the provider servers 500a, 500b, 500c, 500d provide information to each other regarding popularity of application/data/content that maybe popular outside a particular geographical region. As one example, a new application gets released on a particular day, provider servers 500c, 500d, being on the East Coast, typically identify the spikes in popularity first and can share that information with the provider servers 500a, 500b which are further west. Thus, the western provider servers 500a, 500b can prepare for the increased requests before the requests start to become burdensome based on the eastern provider servers 500c, 500d information. The same holds true for events that happen in the evening on the West Coast, the western provider servers 500a, 500b can communicate with the eastern provider servers 500c, 500d so they are ready for their morning requests.

Figure 6:
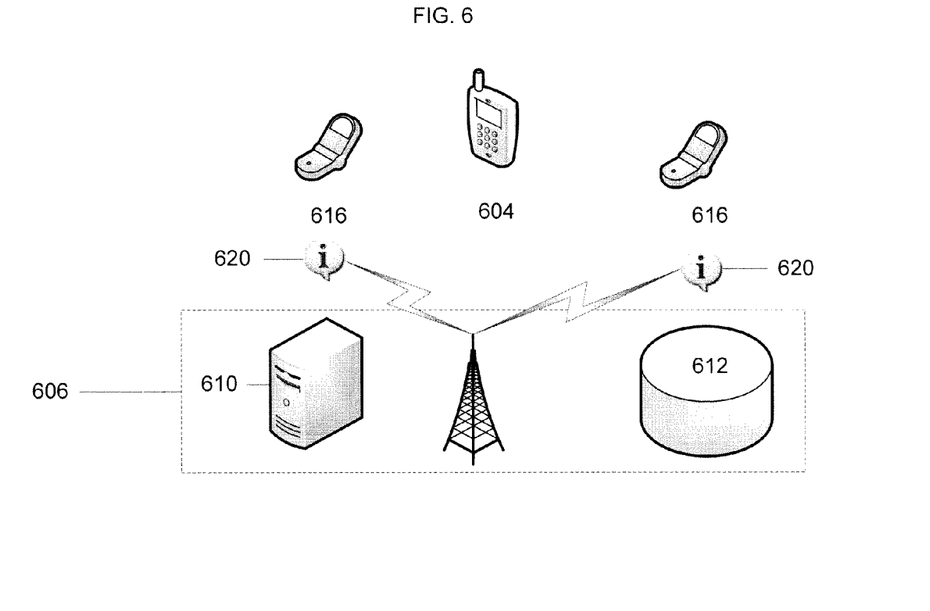
FIG. 6 illustrates a network example that includes probes.

In another example, which may be used in conjunction with the previous examples, and illustrated in FIG. 6, the server 110, 310 can be a search query server 610. The search query server 610 can be configured to perform functions including functions to obtain the location, the time frame restriction, and the distance restriction from the other mobile stations 116, 316. The search query server 610 is also configured to refer to a search query database 612 to create a list of searches and/or results that can be resident on and/or used by the other mobile stations 616 deemed to be present within the time frame restriction and within the distance restriction of the identified location. The search query server 610 can also be configured to cache results for future requests for the same region. The search query database 612 is populated by probes 620 that transmit location, time, and content information from the other mobile stations 616. Probes 620 may be built into an application and collect the location and a unique identification, such as mobile directory number from the other mobile stations 616 and submit the information to the search query server 610 on the network 606 each time a search application is used. Probes 620 may be standalone, or probes 620 may coexist with other libraries used by the application. The search query server 610 of this example can also be configured to transmit to the mobile station 606, the list of searches and/or results resident on and used by the other mobile stations 616 present within the time frame restriction and within the distance restriction of the identified location, as illustrated if FIG. 6.

A search service application client 400 can be executed on the mobile station 604. The search/content service application client 400 can show the user 102 the option to view content on other mobile stations 616 in the vicinity of mobile station 604. The search/content service application client 400 collects the time frame and location restrictions or preferences from the user 102 and determines the current location of the mobile station 604. The search/content service application client 400 also retrieves and displays the list of at least one of the search query and results from the search query server 610 by submitting the user's location and time frame preferences.

The probes 620 may be a standalone application, submitting location of mobile station 604 and application usage information to the search query server 610 and/or the search query database 612. The probes 620 may be stored in a memory (not illustrated) on the mobile station 604, 616 or stored in the network 606 and transmitted to the mobile station 604, 616 upon instruction of the search query server 610. Alternatively, the probes 620 may be built into an application that registers itself with the search query server 610 and/or the search query database 612 periodically when in use, or upon startup. In other embodiments, the probes 620 may piggy back on an existing function. For example, if an application registers itself with a server when it obtains a location, the associated registration information residing on the server may be shared with the search query server 610 and/or the search query database 612, allowing the search query server 610 and/or the search query database 612 to be effectively added to that server.

Figure 7:
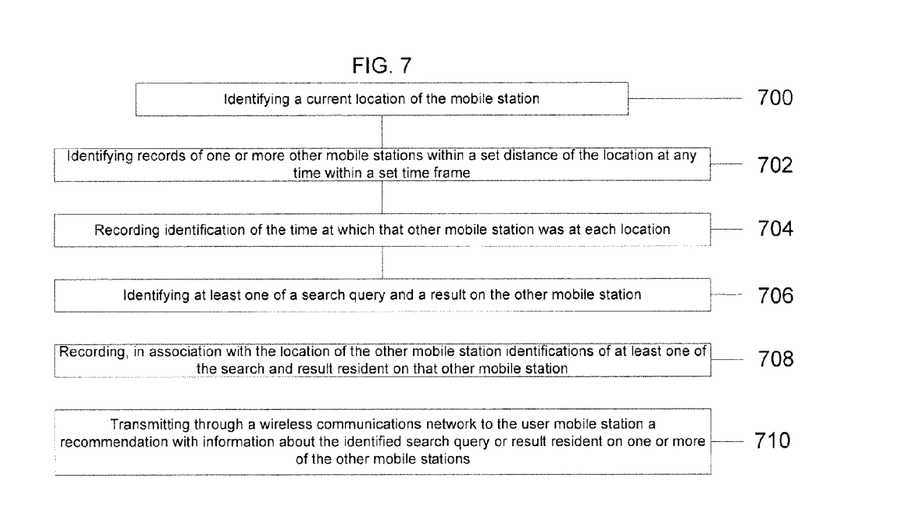
FIG. 7 is a flow chart outlining an example of the present method.

FIG. 7 illustrates an example of a location based method of offering a recommendation of content to the user 102 of the mobile station 104, 304, 604. The method can include the steps of identifying a current location 200 of the mobile station 104, 304, 604 (Step 700). Further, records of one or more other mobile stations 116, 316, 616 that have been within a set distance of the identified location at any time within a set time frame can be identified in a search query database 612 (Step 702). Other steps can include recording in the search query database, in association with locations of each of the other mobile stations, identification of the time at which that other mobile station was at each location (Step 704). Then, for each identified record of another mobile station 116, 316, 616, identifying a search query and/or a result on the other mobile station 116, 316, 616 in the search query database 612 (Step 706). Also, recording in the search query database 612, in association with the location of the other mobile station 116, 316, 616 identifications of the search and/or result resident on that other mobile station 116, 316, 616 (Step 708). Additionally, the network can be responsive to an inquiry received from the mobile station by transmitting through a wireless communications network 106, 306, 606 to the mobile station of the user 104, 304, 604 a recommendation that can include information about the identified search query and/or result resident on one or more of the other mobile stations 116, 316, 616 (Step 710).

In a further example, the information about the search query and/or result includes the number of mobile stations 116, 316, 616 that have performed the search query. Also, the information about the search query and/or result includes a difference in distance and time between the mobile station of the user and the one or more of the other mobile stations that have performed the search query. Additionally, the set distance and set time frame can be specified via manual actuation prior to identifying records.

Figure 8:
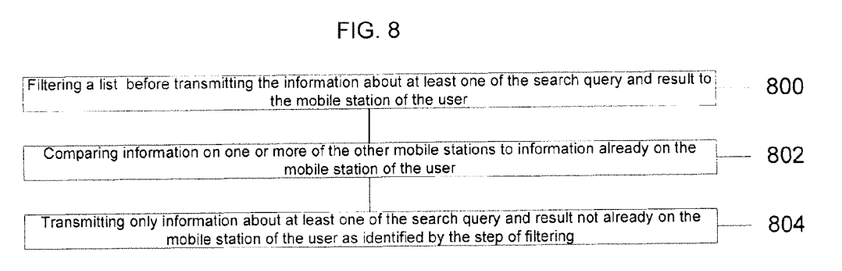
FIG. 8 is another flow chart outlining another one embodiment of a method.

FIG. 8 also illustrates an example of filtering a list having the information about at least one of the search query and result before transmitting the information about at least one of the search query and result to the mobile station of the user (Step 800) Filtering the information can include comparing information identifying the identified search query and/or result resident on one or more of the other mobile stations to information identifying at least one of the search query and result already on the mobile station of the user (Step 802). Additionally, the transmitting step can include transmitting only information about the search query and/or result not already on the mobile station of the user as identified by the step of filtering (Step 804).

Figure 9:
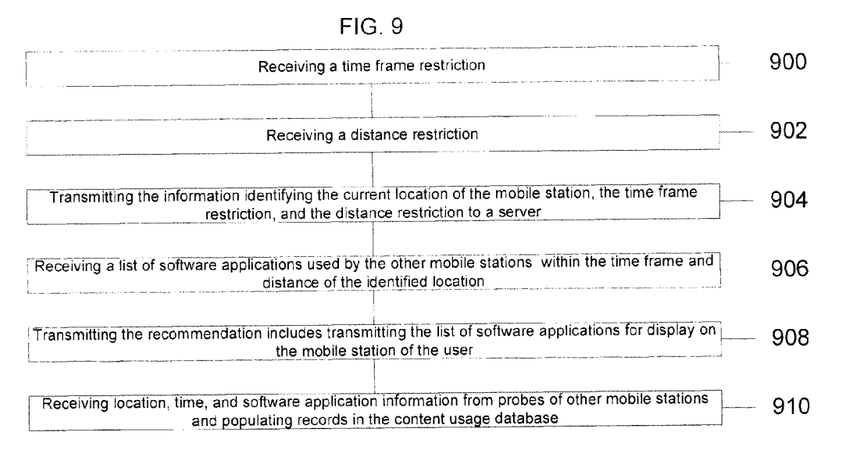
FIG. 9 a further flow chart outlining an example of a method to provide content suggestions.

FIG. 9 also illustrates a further example of a method of receiving a time frame restriction (Step 900), receiving a distance restriction (Step 902), and transmitting the information identifying the current location of the mobile station, the time frame restriction, and the distance restriction to a server (Step 904). Additional steps include receiving, from the search query server, a list of software applications used by the other mobile stations (but perhaps not currently active) present within the time frame restriction and within the distance restriction of the identified location (Step 906). Also, transmitting the recommendation comprises transmitting the list of software applications for display on the mobile station of the user (Step 908). Additionally, the steps of receiving location, time, and software application information from probes of other mobile stations and populating records in the content usage database (Step 910).

Furthermore, the distance restriction and the time frame restriction can be provided via manual actuation. The recommendation is displayed on the mobile station in order of popularity of usage. Alternately, the recommendation can displayed on the mobile station according to a recommendation algorithm using a sorting parameter and incorporating the information about the identified at least one of search query and result resident on one or more of the other mobile stations.

Embodiments taken from the above examples can include a client screen 400 on a user mobile station 104, 304, 604 that provide menus 408 of different types of data/content that can be provided to the user mobile station 104, 304, 604. The server 110, 310, 610 queries the mobile stations 116, 316, 616 to retrieve information to populate each of the categories of menus 408. This information in then sent to the mobile station 104, 304, 604 and displayed. Alternately, or in addition to, the server 110, 310, 610 queries the database, 112, 312, 612 to retrieve the information to populate the menus 408.

An embodiment offering a recommendation of content to a user of a mobile station can first identify a current location of the mobile station 104, 304, 604. The location of the mobile station 104, 304, 604 can be determined using the actual location determined by GPS or triangulation, or a "future" location based on a zip code and/or a street address. A database 112, 312, 612 can keep track of the location of the other mobile stations 116, 316, 616 and store a search query or a result made by that mobile station 116, 316.

Part of identifying a relevant search result is identifying the distance to the other mobile stations 116, 316, 616 and determining if they fall within a relevant radius around the mobile station 104, 304, 604. Another part of the identification is scanning for whether those mobile stations 116, 316, 616 were inside the radius, and making a relevant identification within a set time frame. The time frame can be standard or preset by the user 102. The server 110 identifies a search query or a result on the other mobile station in the search query database. Then, in response to an inquiry received from the user mobile station 104, 304, 604, the server 110, 310, 610 sends, over the wireless communications network, to the user mobile station 104, 304, 604 a recommendation having information about an identified search query or a result resident on one or more of the other mobile stations.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the various country determination and technology detection lists. The programming code is executable by a microprocessor of the mobile station 100, e.g. from storage in a flash memory. For downloading and installation, however, the software is stored within the general-purpose computer platform.

Figure 10:
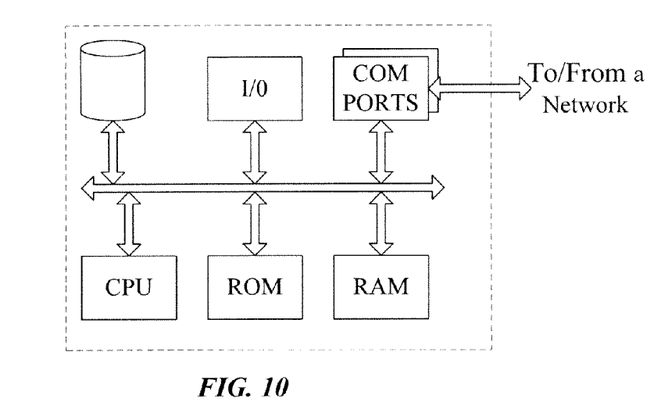
FIG. 10 is simplified functional block diagram of a computer that may be configured as a host or server.
Figure 11:
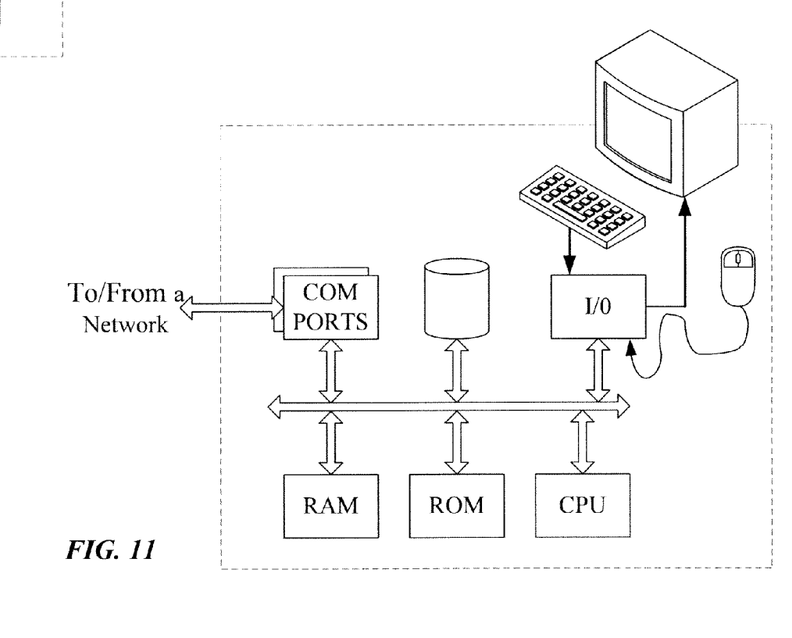
FIG. 11 is a simplified functional block diagram of a personal computer or other work station or terminal device.

FIGS. 10 and 11 provide functional block diagram illustrations of general purpose computer hardware platforms. FIG. 10 illustrates a network or host computer platform, as may typically be used to implement a server. FIG. 11 depicts a computer with user interface elements, as may be used to implement a personal computer or other type of work station or terminal device, although the computer of FIG. 11 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the mobile station, for example, from a server or other computer of the mobile network operator into the mobile station(s) of the operator's customer(s). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising the steps of:
identifying a current location of a mobile station of a user;
identifying, in a search query database, records of one or more other mobile stations that have been within a set distance of the identified location at any time within a set time frame;
for each identified record of another mobile station, identifying at least one of a search query or a result on the other mobile station in the search query database; and
responsive to an inquiry received from the mobile station of the user, transmitting through a wireless communications network to the mobile station of the user a recommendation comprising information about the at least one of identified search query requested by or result provided to one or more of the other mobile stations.

2. The method of claim 1, comprising the steps of:
recording in the search query database, in association with a location of each of the other mobile stations, identification of the time at which the other mobile station was at each location; and
recording in the search query database, in association with the location of the other mobile station, identifications of the at least one of search or result resident on the other mobile station.

3. The method of claim 1, wherein the information about of the at least one search query or result includes the number of mobile stations that have performed the search query.

4. The method of claim 1, wherein the information about the at least one search query or result includes a difference in distance and time between the mobile station of the user and the one or more of the other mobile stations that have performed the search query.

5. The method of claim 1, wherein the set distance and set time frame are specified via manual actuation prior to identifying records.

6. The method of claim 1, comprising the step of filtering a list comprising the information about the at least one search query or result before transmitting the information about the at least one search query or result to the mobile station of the user.

7. The method of claim 6, wherein:
the step of filtering the information comprises comparing information identifying the identified at least one search query or result resident on one or more of the other mobile stations to information identifying at least one search query or result already on the mobile station of the user, and
the transmitting step comprises transmitting only information about the at least one search query or result not already on the mobile station of the user as identified by the step of filtering.

8. The method of claim 1, comprising the steps of:
receiving a time frame restriction;
receiving a distance restriction;
transmitting the information identifying the current location of the mobile station of the user, the time frame restriction, and the distance restriction to a search query server;
receiving, from the search query server, a list of software applications used by the other mobile stations present within the time frame restriction and within the distance restriction of the identified location; and
wherein transmitting the recommendation comprises transmitting the list of software applications for display on the mobile station of the user.

9. The method of claim 8, comprising the steps of receiving location, time, and software application information from probes of other mobile stations and populating records in the content usage database.

10. The method of claim 8, wherein the distance restriction and the time frame restrictions are provided via manual actuation.

11. The method of claim 1, wherein a plurality of recommendations are identified and the recommendations are displayed on the mobile station of the user in order of popularity of usage.

12. The method of claim 1, wherein the recommendation is displayed on the mobile station of the user according to a recommendation algorithm using a sorting parameter and incorporating the information about the identified at least one search query or result resident on one or more of the other mobile stations.

13. A system comprising:
- an interface for communications with a mobile station of a user via a wireless communication network;
- at least one processor coupled to the interface;
- at least one storage device accessible to the at least one processor;
- programming for execution by the at least one processor, stored in the at least one storage device;
- a search query database, stored in the at least one storage device, the search query database comprising records for other mobile stations containing information identifying transmission time and location of the other mobile stations for search requests from or search results delivered to respective ones of the other mobile stations;
- wherein execution of the programming by the at least one processor configures the system to perform functions, including functions to:
  - (a) identify a current location of the mobile station of the user;
  - (b) identify in the search query database, the records of the other mobile stations that have been within a set distance of the identified location at any time within a set time frame;
  - (c) for each identified record of another mobile station, identify at least one of a search query or result resident on the other mobile station in the search query database; and
  - (d) responsive to at least one inquiry received from the mobile station of the user, transmit through the wireless communications network to the mobile station of the user a recommendation comprising information about the identified at least one of the search requested by or the result provided to one or more of the other mobile stations.

14. The system of claim 13, wherein the search query database comprises an application usage database.

15. A system comprising:
- a content download server having interface for communications with a mobile station of a user via a wireless communication network;
- a search query server;
- wherein the content download server is configured to perform functions including functions to:
  - (a) identify a current location of the mobile station of the user;
  - (b) receive a time frame restriction from the mobile station of the user;
  - (c) receive a distance restriction from the mobile station of the user;
  - (d) transmit the location, the time frame restriction, and the distance restriction to the search query server;
  - (e) receive, from the search query server, a list of at least one of a search query or a result resident on and used by other mobile stations present within the time frame restriction and within the distance restriction of the identified location; and
  - (f) transmit the list of at least one search query or result for display on the mobile station of the user;
- wherein the search query server is configured to perform functions including functions to:
  - (a) receive the location, the time frame restriction, and the distance restriction from the content download server;
  - (b) refer to a search query database populated by probes that transmit location, time, and at least one of a search query or result information from the other mobile stations to create the list of at least one of a search query requested by or result provided to and used by other mobile stations present within the time frame restriction and within the distance restriction of the identified location; and
  - (c) transmit, to the content download server, the list of at least one of the search query requested by or the result provided to and used by other mobile stations present within the time frame restriction and within the distance restriction of the identified location.

* * * * *